March 29, 1927.
C. PATTERSON
HANDSAW
Filed July 14, 1926
1,622,466
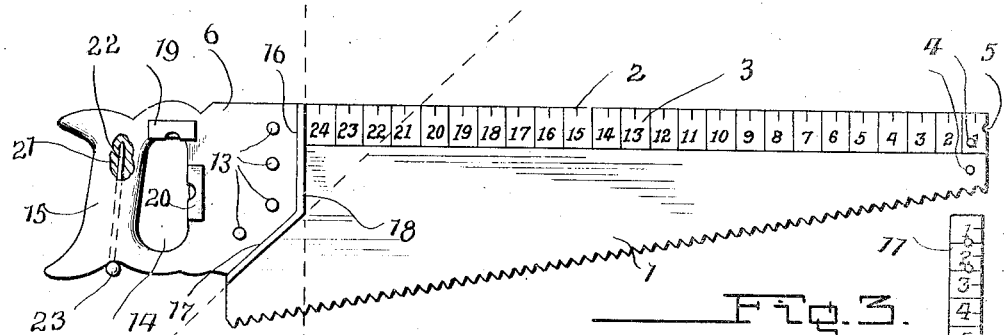
Fig. 1
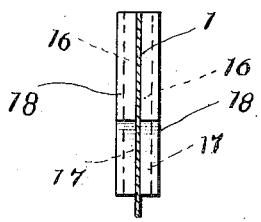
Fig. 2
Fig. 3
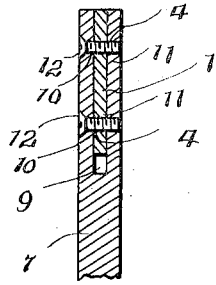
Fig. 4
Inventor
Carl Patterson.
By Lacy & Lacy, Attorneys Patented Mar. 29, 1927.

1,622,466

UNITED STATES PATENT OFFICE.

CARL PATTERSON, OF ALBUQUERQUE, NEW MEXICO.

HANDSAW.

Application filed July 14, 1926. Serial No. 122,419.

This invention relates to tools and more particularly to a handsaw of the type used by carpenters.

One object of the invention is to provide a tool which may be employed as a saw, a square, a gage or ruler, a level, or as a compass by means of which a circle of a desired diameter may be inscribed.

Another object of the invention is to provide an arm or blade which may be securely but releasably held in engagement with the blade of the saw in crossed relation to its free end and together with the saw blade form a try-square.

Another object of the invention is to so form the handle of the saw that a ruler or the like may be engaged with the handle and extend transversely of the blade and project therefrom in predetermined angular relation to the back edge of the saw blade.

Another object of the invention is to permit a scriber to be removably held in the handle of the saw where it may be conveniently reached when needed.

The invention is illustrated in the accompanying drawing, wherein

Fig. 1 is a view showing the improved saw in side elevation;

Fig. 2 is a transverse sectional view through the blade of the saw looking towards the handle thereof;

Fig. 3 is a view in elevation of an auxiliary blade adapted to be removably secured to the blade of the saw and together therewith form a try-square; and Fig. 4 is an enlarged sectional view showing the manner of securing the auxiliary blade to the saw blade.

The saw forming the subject-matter of this invention includes a blade 1 which is similar to an ordinary saw blade except that it is provided along its back or rear edge 2 with scale markings 3 and at its forward or outer end is provided with openings 4 and a semicircular recess 5. In the present illustration, the distance from the outer or forward end of the saw blade to the handle 6 is two feet and, therefore, the scale 3 has been marked to represent twenty-four inches. It will be obvious, however, that the blade may be any length desired and that the scale may extend the full distance from the outer end of the blade to the handle or only a portion thereof.

The auxiliary blade or side arm 7 may be of any desired length and is preferably formed with scale markings 8 to represent inches, as shown in Fig. 3. A longitudinally extending slit 9 is cut from one end of the auxiliary blade and is of such length that the free end portion of the saw blade having the openings 4 formed therein may be disposed in the slit 9 with the openings 4 registering with openings 10 and 11 formed in the auxiliary blade. The openings 10 have their outer portions enlarged so that the heads of the securing screws 12 may be countersunk, as shown in Fig. 4, and the openings 11 are threaded in order to engage the threads of the screws. It will thus be seen that, when the auxiliary blade is disposed in crossed and straddling relation to the free end of the saw blade and the securing screws put in place, the auxiliary blade will be firmly secured and prevented from having movement out of a position at right angles to the back or rear edge 2 of the saw blade. Therefore, the auxiliary blade will cooperate with the saw blade to form a large try-square which may be employed to engage and mark lumber to be cut. The notch 5 formed in the free end of the saw blade is intended to receive a small nail driven into a board or floor so that the saw blade may be swung about the nail and a circle marked upon the board or floor through the medium of a pencil or other scriber engaged with the rear edge of the saw blade at the proper distance from its free end. It will be obvious that, if the pencil is placed three inches from the free end of the saw blade and the blade swung about the nail, a circle six inches in diameter will be marked upon the board.

The handle 6, which is preferably formed of wood and straddles the rear end portion of the saw blade, is firmly secured by the usual fasteners 13 and has an opening 14 formed therein in order to provide a hand grip 15 and passage through which the fingers are passed. At its forward end the handle is provided with an edge face 16 which extends at an angle of ninety degrees to the back edge of the blade 1 and the lower forward portion of the handle is formed with an edge face 17 which preferably extends at an angle of forty-five degrees and intersects the edge face 16. At each side of the saw blade the edge faces 16 and 17 are covered by facing strips 18 which are of sufficient width to project from the side faces of the handle. A side edge face of a board may be engaged by one of the facing strips and the blade of the saw caused to extend across a board either at right angles to the edge face of the board or at an angle of forty-five degrees thereto and the saw employed as a square or gage in order to mark the board for cutting. It will be obvious that scale markings may be provided upon both side faces of the saw blade so that it may be readily employed to cut the stringers forming a portion of a stairway. It will also be obvious that a ruler or other straight edge could be placed against a selected portion of one of the facing strips and caused to project from the back edge of the saw blade at a desired angle thereto. Levels 19 and 20 are embedded in the handle in facing relation to an end and one side of the opening 14, and the hand grip 15 has been drilled to provide a pocket 21 into which a scriber 22 may be inserted. The scriber 22 is preferably formed of metal and is provided with an enlarged head 23 which limits its inward movement into the pocket and further permits it to be easily withdrawn when its use is necessary. It will thus be seen that there has been provided a saw which may be used as an ordinary cutting saw and may also be employed by a carpenter to mark and gage work to be cut. By reversing the auxiliary blade 7 so that it projects from the rear edge of the saw blade, a large try-square will be formed.

Having thus described the invention, I claim:

A saw comprising a blade, and a handle secured to one end portion of the blade, said blade having a straight rear edge, an auxiliary blade extending transversely of the saw blade and having one end portion formed with a longitudinally extending slot providing arms to overlap opposite side faces of the saw blade, the saw blade having openings formed in its free end portion and the arms of the auxiliary blade being provided with alined openings to register with the openings in the saw blade, and fasteners passed through the registering openings of the blades to releasably secure the auxiliary blade to the saw blade at right angles to its back edge.

In testimony whereof I affix my signature.

CARL PATTERSON. [L. S.]